United States Patent
Duxbury et al.

(10) Patent No.: US 9,420,530 B1
(45) Date of Patent: Aug. 16, 2016

(54) WAP WITH CONTEXT SENSITIVE ENERGY MANAGEMENT

(71) Applicant: Quantenna Communications, Inc., Fremont, CA (US)

(72) Inventors: Simon Duxbury, Danville, CA (US); Wing Kai Chong, San Ramon, CA (US); Mark Sheahan, Mountain View, CA (US)

(73) Assignee: Quantenna Communications, Inc., Fremont, CA (US)

( * ) Notice: Subject to any disclaimer, the term of this patent is extended or adjusted under 35 U.S.C. 154(b) by 169 days.

(21) Appl. No.: 14/338,340

(22) Filed: Jul. 22, 2014

Related U.S. Application Data

(60) Provisional application No. 61/857,197, filed on Jul. 22, 2013.

(51) Int. Cl.
 *H04W 52/02* (2009.01)
 *H04W 84/12* (2009.01)
 *H04W 88/08* (2009.01)

(52) U.S. Cl.
 CPC .......... *H04W 52/0206* (2013.01); *H04W 52/02* (2013.01); *H04W 84/12* (2013.01); *H04W 88/08* (2013.01)

(58) Field of Classification Search
 CPC . H04W 28/0221; H04W 52/00; H04W 52/02; H04W 52/0203; H04W 52/0216; H04W 52/0206
 See application file for complete search history.

(56) References Cited

U.S. PATENT DOCUMENTS

| | | | | |
|---|---|---|---|---|
| 2004/0260930 | A1* | 12/2004 | Malik ..................... | G06F 21/10 713/176 |
| 2010/0138549 | A1* | 6/2010 | Goel ................. | H04W 52/0225 709/228 |
| 2010/0284316 | A1* | 11/2010 | Sampathkumar . | H04W 52/0216 370/311 |
| 2013/0107981 | A1* | 5/2013 | Sampath ............... | H04W 88/00 375/295 |

OTHER PUBLICATIONS

M. Ghast, 802.11 Wireless Networks: The Definitive Guide, 2nd Edition, chapter 4, pp. 1-3, 2005.*

* cited by examiner

*Primary Examiner* — Christopher Crutchfield
(74) *Attorney, Agent, or Firm* — IP Creators; Charles C Cary

(57) ABSTRACT

A wireless access point (WAP) including: an airtime correlator, a dormancy allocator and a medium access control (MAC). The airtime correlator is configured to correlate airtime usage of the selected communication channel by the WAP with one of an idle WLAN state characterized by an absence of upstream or downstream communications and an active WLAN state characterized by at least one of upstream and downstream communications on the WLAN. The dormancy allocator is configured to allocate during at least one of the idle and the active WLAN states, a portion of available airtime to at least one dormancy interval in which a base power level of the WAP is reduced at least below a level required to support downstream communications. The MAC is configured to identify for the plurality of station nodes on the WLAN, a contention free period overlapping in time with the at least one dormancy interval.

8 Claims, 5 Drawing Sheets

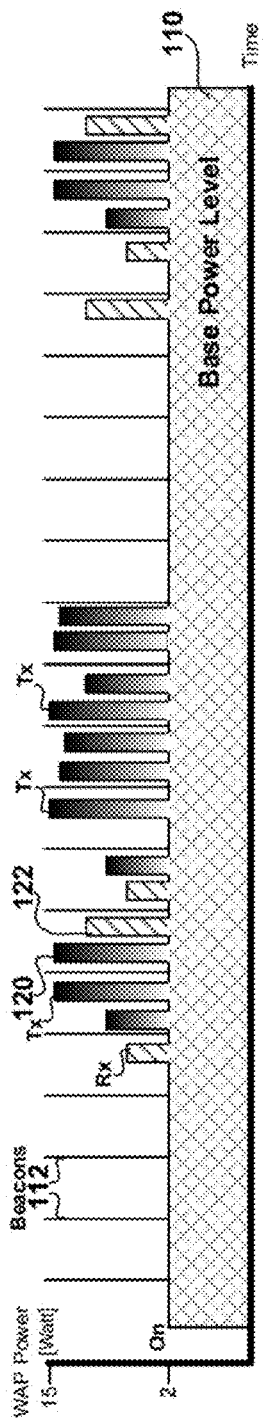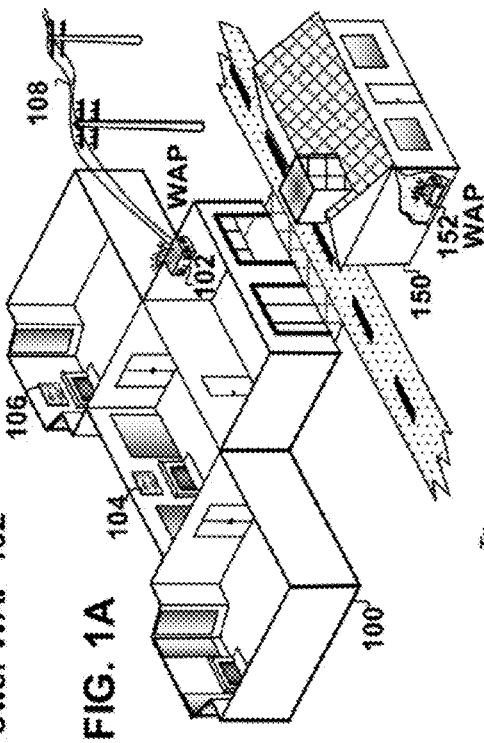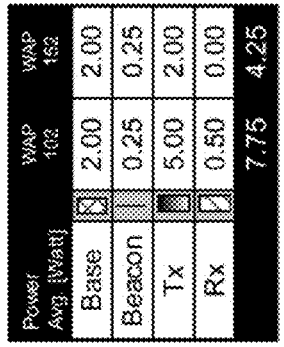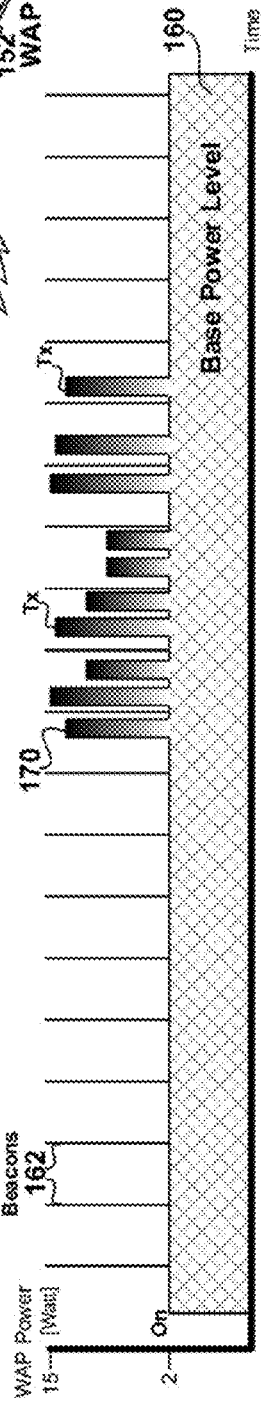
FIG. 1A
FIG. 1B PRIOR ART
FIG. 1C PRIOR ART
FIG. 1D

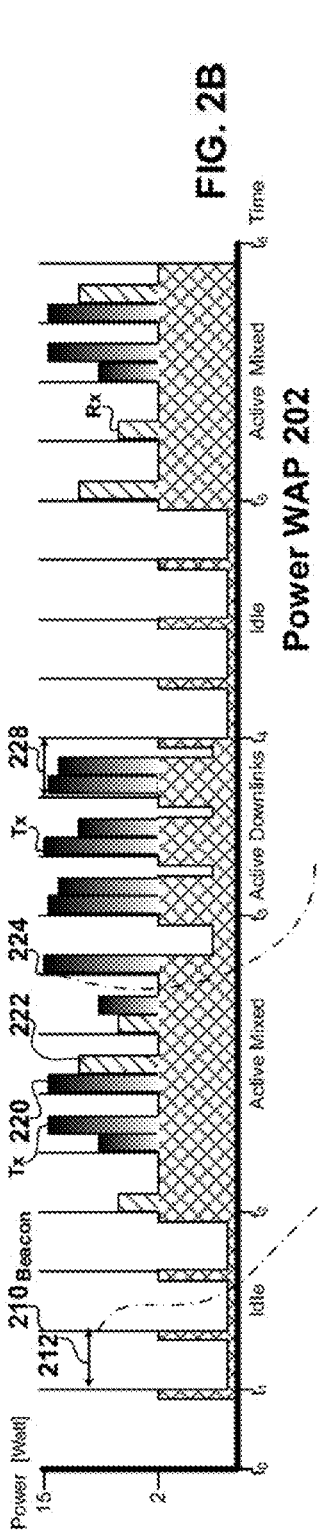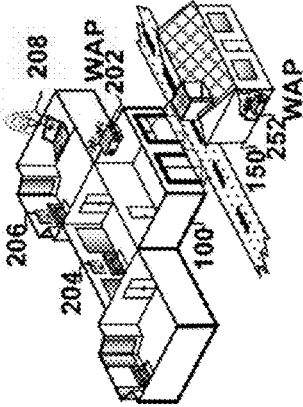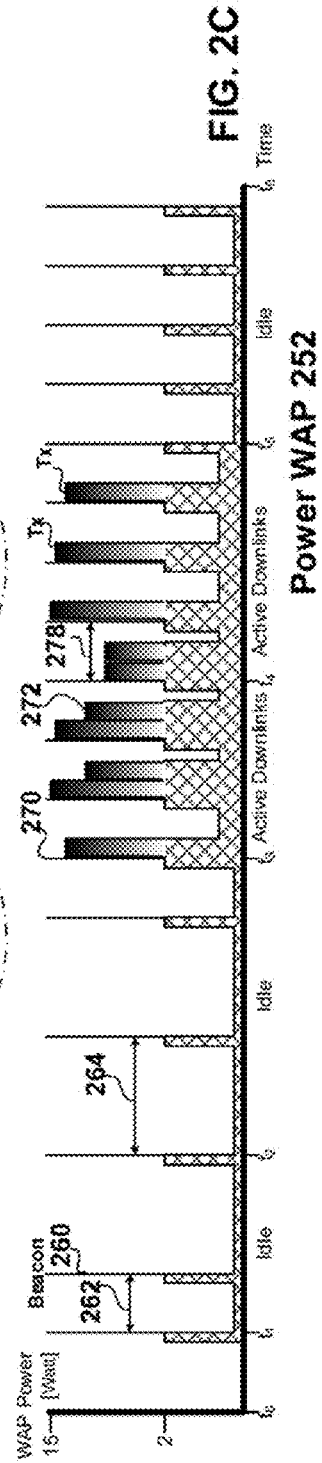

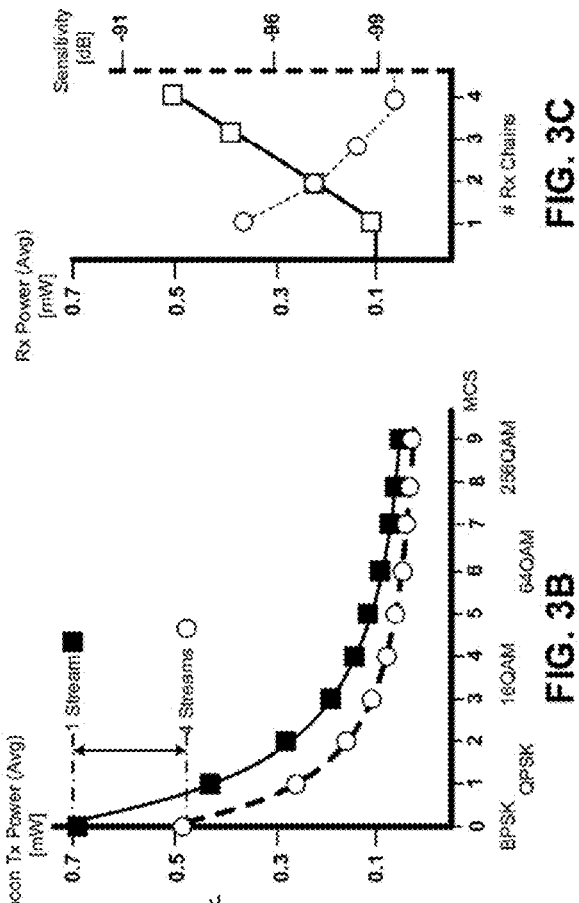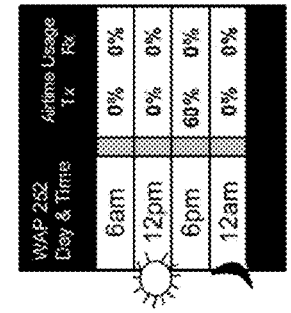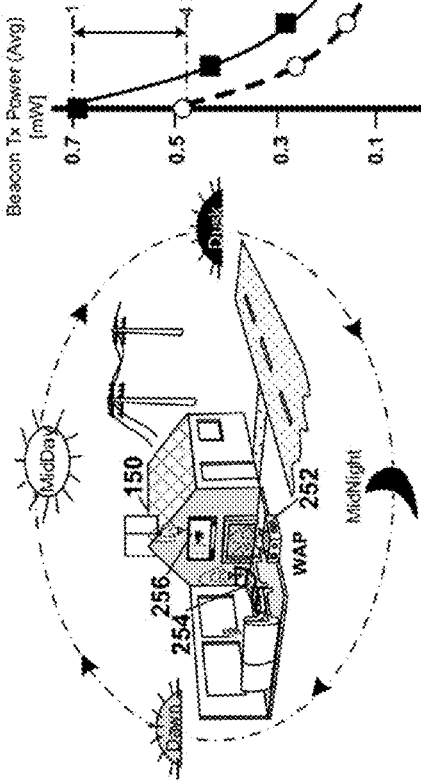

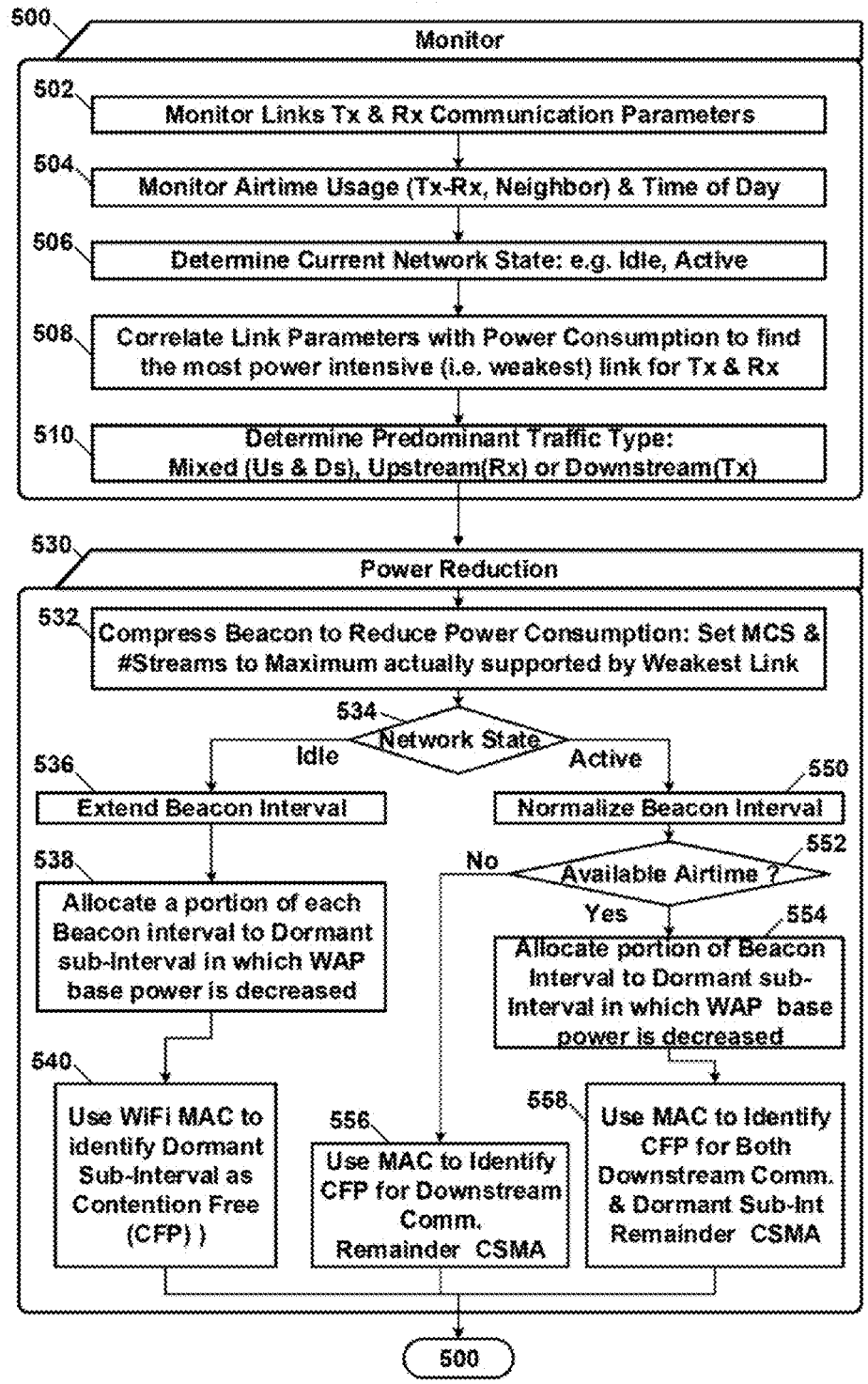
FIG. 5      CONTEXT SENSITIVE ENERGY MANAGEMENT

WAP WITH CONTEXT SENSITIVE ENERGY MANAGEMENT

CROSS REFERENCE TO RELATED APPLICATION

This application claims the benefit of prior filed Provisional Applications No. 61/857,197 filed on Jul. 22, 2013 entitled "Power Efficient AP Operation for Video Application" which is incorporated herein by reference in its entirety as if fully set forth herein.

BACKGROUND OF THE INVENTION

1. Field of Invention

The field of the present invention relates in general to wireless local area networks (WLAN) including wireless access points (WAP) and methods of energy management thereon.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, communications from a single source node to one target node at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP.

The IEEE 802.11ac standard also opened up new channel bandwidths, up to 160 MHz in a new WiFi frequency range, i.e. 5 GHz. A large portion of the designated channels in the 5 GHz range, were subject to prior use for weather, airport, and military radar of governmental and civilian entities. The IEEE 802.11ac standard codifies the ongoing and exclusionary entitlement of these entities to these portions of the 5 GHz spectrum. This preferential treatment is reflected in the IEEE 802.11ac standard which proscribes that any channel eligible for radar, e.g. Channels 52-64 and 100-144 in the US, can be used for WiFi only if the radar is not active. This general set of protocols and workflows surrounding WiFi access to radar eligible channels is identified as Dynamic Frequency Selection (DFS) with the radar eligible channels identified as DFS channels.

Each revision of the IEEE 802.11 standard, offers enhanced capabilities and capacity. These capabilities come at a price in terms of increased power consumption.

What is needed are methods for managing power consumption on a WAP.

SUMMARY OF THE INVENTION

The present invention provides a method and apparatus for a wireless access point (WAP) apparatus which supports context sensitive power management of communications with IEEE 802.11 stations.

In an embodiment of the invention a wireless access point (WAP) transceiver apparatus is disclosed. The WAP is configured to support wireless local area network (WLAN) communications with a plurality of station nodes on a selected communication channel including a plurality of orthogonal frequency-division multiplexed (OFDM) sub-carriers. The WAP transceiver apparatus includes: an airtime correlator, a dormancy allocator and a medium access control (MAC). The airtime correlator is configured to correlate airtime usage of the selected communication channel by the WAP with one of an idle WLAN state characterized by an absence of upstream or downstream communications and an active WLAN state characterized by at least one of upstream and downstream communications on the WLAN. The dormancy allocator is coupled to the airtime correlator and configured to allocate during at least one of the idle and the active WLAN states, a portion of available airtime to at least one dormancy interval in which a base power level of the WAP is reduced at least below a level required to support downstream communications. The medium access control (MAC) is coupled to the dormancy allocator and configured to identify for the plurality of station nodes on the WLAN, a contention free period overlapping in time with the at least one dormancy interval; thereby avoiding demand for WAP communication resources during the at least one dormancy interval.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-D are an isometric environmental view, graphs, and a table of Prior Art WAPs estimated power consumption;

FIGS. 2A-F are an isometric environmental view, graphs, and a table of WAPs with context sensitive power management features in accordance with an embodiment of the invention;

FIGS. 3A-E are an isometric environmental view, graphs, and tables of representative contexts monitored by the WAPs in accordance with an embodiment of the invention;

FIG. 5 is a process flow diagram of processes associated with a WAP supporting context sensitive energy management in accordance with an embodiment of the invention.

DETAILED DESCRIPTION OF THE EMBODIMENTS

Figure 4:
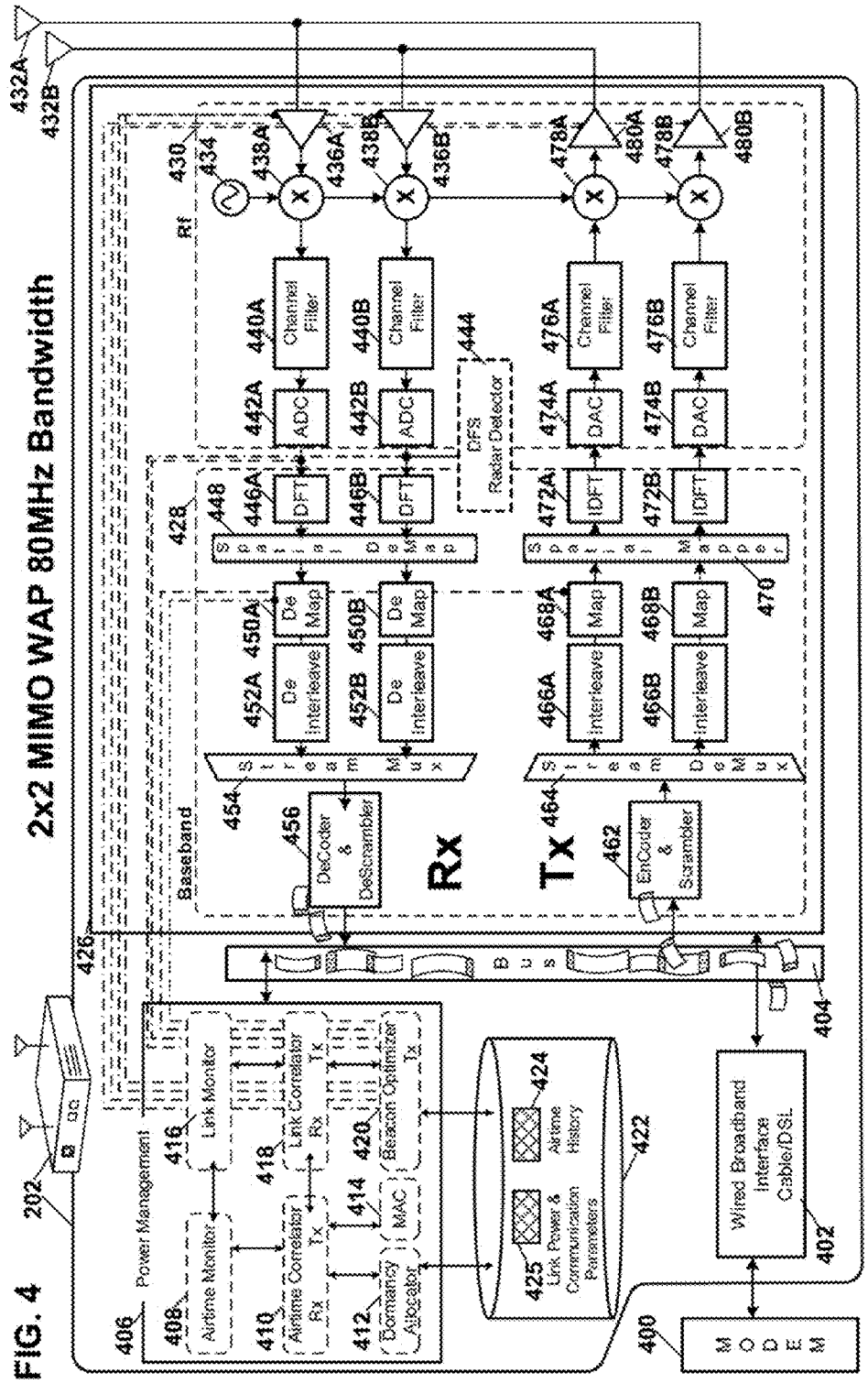
FIG. 4 is a hardware block diagram of a WAP with context sensitive power management in accordance with an embodiment of the invention.

The present invention provides a method and apparatus for avoiding service interruptions on a wireless local area network (WLAN) during bootup or showtime channel selection, including DFS channel selection requiring monitoring for active radar signals as a precondition to channel initialization.

FIGS. 1A-D are an isometric environmental view, graphs, and a table of Prior Art WAPs estimated power consumption.

FIG. 1A is an isometric view of two homes 100 and 150 and the associated WLAN nodes servicing same. In home 100 a wireless access point (WAP) 102 coupled to a broadband wired connection 108 is shown providing a wireless local area network (WLAN) for station nodes 104 and 106, e.g. wireless HDTV's within the home. In home 150 a wireless access point (WAP) 152 provides a discrete WLAN for station nodes (not shown) within the home.

FIGS. 1B-1C are graphs of power consumption over time by WAPs 102 and 152 respectively. Power consumption is broken into four discrete groups: base power, beacon power, transmit power, and receive power. Base power levels 110 and 160 are constant in both WAPs 110 and 160 respectively. Each WAP uses an intermittent beacon to announce the WLAN service it provides and the requirements for joining same. Beacon power is the power associated with transmitting intermittent WAP beacons, e.g. beacons 112 and 162, at regular beacon intervals, typically 100 milli-seconds (mS). Transmit power is the power associated with the WAP's transmission of actual downstream communication packets to an HDTV or other wireless device, a.k.a. station. Transmit power intervals 120 and 170 during which downstream packets are transmitted by WAPs 102 and 152 respectively are shown. Receive power is the power associated with the WAP's reception of actual upstream communication packets from an HDTV or other wireless device, a.k.a. station. Receive power intervals 122 during which upstream packets are received by WAP 102 are shown. WAP 152 experiences no upstream power consumption due to the fact the corresponding usage pattern in home 152 is different than that in home 100.

FIG. 1D is a table summarizing average power consumption of the WAPs 102 and 152 over the time period, e.g. 1 day, shown in corresponding graphs in FIGS. 1B and 1C respectively. Base and Beacon power consumption is constant in both homes while the power consumed in upstream and downstream communications varies depending on factors including the usage patterns in each home.

FIGS. 2A-F are an isometric environmental view, graphs, and a table of WAPs with context sensitive power management features in accordance with an embodiment of the invention.

FIG. 2A is an isometric view of the two homes 100 and 150 shown in FIG. 1. WAPs 202 and 252 provide discrete WLAN service to homes 100 and 150 respectively. In home 100 WAP 202 is shown providing a WLAN for station nodes 204, 206, 208 within the home. In home 150 WAP 252 provides a discrete WLAN for station nodes (not shown) within the home. These WAPs incorporate the context sensitive power management of an embodiment of the invention and generate estimated average power savings of 14% in home 100 and 36% in home 150 versus their prior art counterparts as shown in FIG. 1.

FIGS. 2B-2C are graphs of power consumption over time by WAPs 202 and 252 respectively. Power consumption is again broken down into four discrete groups: base power, beacon power, transmit power, and receive power. Base power levels are no longer constant in both homes. Each WAP distinguishes intervals when the WLAN is idle with no communications from intervals in which the WLAN is active with either or both upstream and downstream communications. These intervals are identified on the horizontal axis of the graphs in both FIGS. 2B and 2C. When the WLAN is idle each WAP establishes dormant intervals during which upstream and downstream communications cease and base power levels to the transmit and receive chains are severely reduced. When the WLAN is active but has some remaining free airtime each WAP establishes dormant intervals during which upstream and downstream communications cease and base power levels to the transmit and receive chains are moderately reduced. Collectively the power reductions in these dormant intervals significantly reduce overall base power consumption without service interruption. Each WAP again uses an intermittent beacon to announce the WLAN service it provides and the requirements for joining same. In FIG. 2B a representative beacons 210, 224 and beacon intervals 212 and 228 are shown. Due to the relatively short duration of the WLAN's idle states the beacons in the idle state have the same periodicity or beacon interval 212 as do the beacon intervals associated with the WLAN's active state, e.g. beacon interval 228. In one embodiment of the invention average beacon power consumption is reduced by lengthening the beacon interval during any extended idle WLAN state. In FIG. 2C a representative beacons 260, 270 and beacon intervals 262, 264, 278 are shown. Due to the relatively long duration of the WLAN's idle state from $t_1$-$t_3$ the initial beacon interval 262 is increased to beacon interval 264 in the idle state and returned to a normal interval, e.g. beacon interval 278 of 100 mS, when the WLAN is in an active state from $t_3$-$t_5$. Thus average beacon power consumption is reduced from the extension of the beacon interval during the idle state of the WLAN.

Transmit power is the power associated with the WAP's transmission of actual downstream communication packets to an HDTV or other wireless device, a.k.a. station. Transmit power intervals 220 and 272 during which downstream packets are transmitted by WAPs 202 and 252 respectively are shown. Receive power is the power associated with the WAP's reception of actual upstream communication packets from an HDTV or other wireless device, a.k.a. station. Receive power intervals 222 during which upstream packets are received by WAP 202 are shown. WAP 252 experiences no upstream power consumption due to the fact the corresponding usage pattern in home 152 is different than that in home 100.

FIGS. 2D-2E are exploded views of beacons 210 and 224 in the graph shown in FIG. 2B. They illustrate the power saving dormant intervals 284 and 294 occurring during the idle and active WLAN states respectively. Generally the dormant interval(s) during the idle state of the WLAN are greater than the dormant interval(s) when the WLAN is in an active state. Each dormant interval is overlapped, a.k.a. shielded, by a corresponding contention free period (CFP) during which the WAP will neither transmit nor receive upstream and downstream communications.

In FIG. 2D a duration field in the beacon 210 establishes the overlapping CFP. Each station upon receipt of the beacon calculates its Network Allocation Vector (NAV) corresponding to the CFP 280. The NAV provides a virtual carrier sensing mechanism to control network access by signaling all stations on the network that the WAP is unavailable for the specified contention free period (CFP) 280. If the dormant interval exceeds the maximum duration allowed by the duration field, then a Clear to Send (CTS)-to-self frame/packet may be sent with it's duration field used to extend the CFP to the end of the dormant interval. In each beacon interval, the dormant interval may terminate before the next beacon so as to allow a contention based interval 286, during which physical carrier sensing identified as carrier sense multiple access (CSMA) may be used to control network access. Beacon power is also reduced. In one embodiment of the invention this is achieved by elevating the modulation and coding schema (MCS) index and or the number of streams used to transmit the beacon. Denser constellations associated with higher MCS indices and more streams to transmit the beacons shorten the beacon duration 282 and associated power consumption. Additionally, provided the MCS and stream levels are not elevated above the levels actually supported by the station associated with the WLAN's links and associated station this method of power savings does not negatively impact WLAN service.

In FIG. 2E the duration field in the beacon 224 establishes the overlapping CFP not only for the dormant interval but also for any required downstream communications 298. Each station upon receipt of the beacon calculates its Network Allocation Vector (NAV) corresponding to the CFP 290. The NAV provides a virtual carrier sensing mechanism to control network access by signaling all stations on the network that the WAP is unavailable for the specified contention free period (CFP) 290. In each beacon interval, the dormant interval may terminate before the next beacon so as to allow a contention based interval 296, during which physical carrier sensing identified as carrier sense multiple access (CSMA) may be used to control network access for upstream communications. Beacon power is also reduced. In one embodiment of the invention this is achieved by elevating the modulation and coding schema (MCS) index and or the number of streams used to transmit the beacon. Denser constellations associated with higher MCS indices and more streams to transmit the beacons shorten the beacon duration 292 and associated power consumption. Additionally, provided the MCS and stream levels are not elevated above the levels actually supported by the station associated with the WLAN's links and associated station this method of power savings does not negatively impact WLAN service.

FIG. 2F is a table summarizing average power consumption of the WAPs 202 and 252 over the time period, e.g. 1 day, shown in corresponding graphs in FIGS. 2B and 2C respectively. Base and Beacon power consumption are no longer constant as is the case with the prior art WAPs shown in FIG. 1. WAPs 202 and 252 incorporate the context sensitive power management of an embodiment of the invention and generate estimated average power savings of 14% in home 100 and 36% in home 150 versus their prior art counterparts as shown in FIG. 1.

FIGS. 3A-E are an isometric environmental view, graphs, and tables of representative contexts monitored by the WAPs in accordance with an embodiment of the invention. FIG. 3A shows the WAP 252 providing WLAN service to stations 254 and 256 in home 150. FIG. 3B is a graph of beacon power versus MCS for beacons transmitted with 1 stream and 4 streams. Beacons transmitted with higher MCS are of shorter duration and consume significantly less power. Beacons transmitted with higher number of streams are also of shorter duration and consume significantly less power. FIG. 3C is a graph of receive power versus sensitivity for different numbers of WAP receiver chains. More chains provide higher sensitivity to received upstream communications but at a cost of more power consumption. FIG. 3D is a link table showing context information concerning each link and the associated communication parameters required for the WAP to communicate with same. The weakest link 254 requires the most transmit and receive power to communicate with it. This 'weakest link' has a maximum achievable/actual MCS that is lower than that of the other links, as well as a maximum stream count that is lower than that of the other links. The WAP uses this "weakest link" information to control beacon power consumption. FIG. 3E is an airtime table which correlates time of day (TOD) with transmit airtime usage, receive airtime usage, and total airtime usage including interference from other networks. This context information may be used to improve the accuracy of the idle versus active WLAN state determination.

FIG. 4 is a hardware block diagram of a WAP with context sensitive power management in accordance with an embodiment of the invention. The WAP is shown as supporting MIMO communications over 2 antenna each linked to two transmit and receive chains. This embodiment of the invention is however without departing from the scope of the claimed invention equally applicable to a WAP that has a single antenna and does not support MIMO communications.

The MIMO transceiver path components include antennas 432A and 432B. The antennas are coupled to radio frequency (RF) module 430 and baseband module 428 of the WLAN stage 426, which implements in an embodiment of the invention the IEEE 802.11* standard for WLAN, with the '*' standing for the particular sub-standard, e.g. a, b, g, n, ac, ad, ax.

A first MIMO receive path originates with the antenna 432A, and includes: low noise amplifier (LNA) 436A, the tunable oscillator 434 and mixer 438A which down converts the received data channel, for filtration by the channel filter 440A, conversion in the analog-to-digital converter (ADC) 442A and domain conversion from the frequency to the time domain in the Discrete Fourier Transform (DFT) module 446A. The corresponding second MIMO receive path components are labeled with the "B" suffix. In an embodiment of the invention one of the receive chains includes a radar detector 444 coupled to the output of the ADC 442B to detect the energy associated with active radar on a DFS channel. During the dormant interval when base power to all transmit and receive chains is normally reduced, a determination would be made by the dormancy allocator 412 as to whether the channel was a DFS channel requiring continuous radar monitoring during either idle or active WLAN states. In this case, the base power to the Rf portion of one of the receive chains would be maintained to allow continuous monitoring of the DFS channel for radar.

In the baseband module 428 the complex coefficients for each sub-channel in each symbol interval are subject to spatial demapping in spatial demapper 448 followed by demapping in the associated one of demappers 450A-B. The resultant bits are deinterleaved in the associated one of deinterleavers 452A-B. Next the received data is multiplexed in stream multiplexer 454 and decoded and descrambled in the decoder and descrambler 456 which couples to the packet based bus 404.

The transmit path components in this embodiment of the invention are also shown. The data to be transmitted is encoded and scrambled in the encoder and scrambler 462. It is then demultiplexed into independent data paths one for each antenna in the stream demultiplexer 464. Next data is interleaved and mapped in the associated one of interleavers 466A-B and mappers 468A-B. Next the complex coefficients corresponding to the data are spatially mapped in the spatial mapper 470 using a selected beamforming matrix. Then the mapped coefficients of each sub-channel are transformed from the frequency domain to the time domain in the associated one of inverse discrete Fourier transform (IDFT) modules 472A-B.

Next, in the radio frequency module 430 the digital-to-analog (DAC) conversion is accomplished by the associated one of DACs 474A-B followed by filtration by the associated one of channel filters 476A-B. Next the filtered signals are upconverted in the associated one of upconverters 478A-B and amplified by the associated one of power amplifiers 480A-B each coupled to an associated one of antennas 432A-B for transmission to the receiving device. The device also includes a broadband interface 402 for interfacing with a digital signal line (DSL) or cable modem 400.

The transmit and receive paths operate under control of the power management module 406. The power management module includes: an airtime monitor 408, an airtime correlator 410, a dormancy allocator 412, a MAC 414, a link monitor 416, a link correlator 418 and a beacon optimizer 420. Storage 422 couples to the power management module 406. The airtime monitor 408 monitors airtime usage and stores a resultant history in table 424 in storage 422. The link monitor 416 monitors each link to determine its power consumption at various combinations of communication parameters, e.g. MCS index, # of streams, power consumption and sensitivity and stores the resultant parameters 425 in storage 422. The airtime correlator 410 is configured to correlate airtime usage of the selected communication channel by the WAP with one of an idle WLAN state characterized by an absence of upstream or downstream communications and an active WLAN state characterized by at least one of upstream and downstream communications on the WLAN. The dormancy allocator 412 is coupled to the airtime correlator and configured to allocate during at least one of the idle and the active WLAN states, a portion of available airtime to at least one dormancy interval in which a base power level of the WAP is reduced at least below a level required to support downstream communications. The medium access control (MAC) is coupled to the dormancy allocator and configured to identify for the plurality of station nodes on the WLAN, a contention free period overlapping in time with the at least one dormancy interval; thereby avoiding demand for WAP communication resources during the at least one dormancy interval.

FIG. 5 is a process flow diagram of processes associated with a WAP supporting context sensitive energy management in accordance with an embodiment of the invention. Processing begins in the block 500 of processes associated with monitoring WLAN activity. In process 502 each WLAN link is monitored to determine its power consumption at various combinations of communication parameters, e.g. MCS index, # of streams, power consumption and sensitivity. In process 504 airtime usage versus time of day is monitored for the WLAN. In process 506 a determination as to current WLAN state, i.e. active or idle, is reached based on either instantaneous airtime monitoring, or historical airtime monitoring at the instant time of day, or a combination of the two. In process 508 link parameters are correlated with power consumption to find the least efficient link. This weakest link and associated station can only be accessed with a lower MCS and stream count than other links and requires higher transmit and receive power. In process 510 the predominant WAP traffic type, e.g. upstream or downstream or a mix of same, is determined. Once this context sensitive information is accumulated control is passed to the power reduction block 530.

Next, processing continues in the block 530 of processes associated with context sensitive power reduction in the WAP. In process 532 the beacon duration is reduced by setting MCS and # streams to the maximum level actually supported by the weakest link. This has the effect of reducing average beacon power consumption. Next control is passed to decision process 534 in which the network state is determined. This determination may be based on the duration of network inactivity, on instantaneous airtime usage, or historical airtime monitoring or a combination of both for the subject time of day.

If the WLAN is determined to be in the idle state then control is passed to process 536 in which the beacon interval may be extended to save power. Control then passes to process 538 in which a determination is made as to the allocation of a portion of each beacon interval to a dormant interval/sub-interval in which WAP base power may be significantly reduced since no upstream or downstream communications will be handled. In an embodiment of the invention in which the selected communication channel is not a DFS channel, i.e. does not require radar detection, base power reduction during the dormant interval can be applied to all transmit and receive chains. Alternately if the channel is a DFS channel, base power reduction is made to all transmit chains and all except one of the receive chains, to allow continuous monitoring of the DFS channel for radar. Control then passes to process 540 in which the IEEE 802.11 MAC, e.g. beacon dormancy field associated with the NAV, is used to establish a contention free period (CFP) which overlaps the dormant interval and assures that the WLAN service will not be interrupted. Any extensions to the dormancy interval beyond those supported with the existing duration field value upper limit, may be obtained by momentarily increasing transmit base power so as to send a CTS-to-Self in which the duration field is set to extend the CFP to the end of the dormancy interval. Control then returns to process block 500.

Alternately, if the WLAN is determined to be in the active state then control is passed to process 550 in which the beacon interval may be returned to its normal interval, e.g. 100 mS for robust WLAN performance. Control is then passed to decision process 552 in which a determination is made as to the amount of available airtime. If there is no available airtime, e.g. either upstream or downstream traffic is very heavy, and there is little room for base power savings through the creation of dormant intervals, then control is passed to process 556. In process 556 the MAC, e.g. duration field, in the beacon is set to establish a CFP which spans the expected duration of the WAP's downstream communications after which control returns to process block 500.

Alternately if there is available airtime then control is passed to process 554 in which a portion of the beacon interval is allocated to the dormant sub-interval/interval in which WAP base power is decreased. In an embodiment of the invention in which the selected communication channel is not a DFS channel, i.e. does not require radar detection, base power reduction during the dormant interval can be applied to all transmit and receive chains. Alternately if the channel is a DFS channel, base power reduction is made to all transmit chains and all except one of the receive chains, to allow continuous monitoring of the DFS channel for radar. Control then passes to process 558 in which the MAC uses the duration field in the beacon to identify a CFP for downstream communications of the WAP together with any dormant sub-interval/interval. The duration field in the header of the last transmitted downstream packet may be used to extend the CFP to span the dormant sub-interval/interval. The dormant interval ends before the next beacon, to allow a contention period during which the stations can use CSMA to access the WLAN for upstream communications. Control then returns to process block 500.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) transceiver apparatus, configured to support wireless local area network (WLAN) communications with a plurality of station nodes on a selected communication channel including a plurality of orthogonal frequency-division multiplexed (OFDM) sub-carriers; and the WAP transceiver apparatus comprising:
an airtime correlator configured to correlate airtime usage of the selected communication channel by the WAP with one of an idle WLAN state characterized by an absence of upstream or downstream communications and an active WLAN state characterized by at least one of upstream and downstream communications on the WLAN; and
the airtime correlator further configured to correlate airtime usage history with current airtime usage to optimize a correlation between airtime usage and the active and idle WLAN states
a dormancy allocator coupled to the airtime correlator and configured to allocate during at least one of the idle and the active WLAN states, a portion of available airtime to at least one dormancy interval in which a base power level of the WAP is reduced at least below a level required to support downstream communications; and
a medium access control (MAC) coupled to the dormancy allocator and configured to identify for the plurality of station nodes on the WLAN, a contention free period overlapping in time with the at least one dormancy interval; thereby avoiding demand for WAP communication resources during the at least one dormancy interval.

2. A wireless access point (WAP) transceiver apparatus, configured to support wireless local area network (WLAN) communications with a plurality of station nodes on a selected communication channel including a plurality of orthogonal frequency-division multiplexed (OFDM) sub-carriers; and the WAP transceiver apparatus comprising:
an airtime correlator configured to correlate airtime usage of the selected communication channel by the WAP with one of an idle WLAN state characterized by an absence of upstream or downstream communications and an active WLAN State characterized by at least one of upstream and downstream communications on the WLAN;
a dormancy allocator coupled to the airtime correlator and configured to allocate during at least one of the idle and the active WLAN states, a portion of available airtime to at least one dormancy interval in which a base power level of the WAP is reduced at least below a level required to support downstream communications;
a medium access control (MAC) coupled to the dormancy allocator and configured to identify for the plurality of station nodes on the WLAN, a contention free period overlapping in time with the at least one dormancy interval; thereby avoiding demand for WAP communication resources during the at least one dormancy interval; and
a beacon optimizer coupled to the airtime correlator and configured to extend a beacon interval of intermittent beacons transmitted by the WAP responsive to a correlation by the airtime correlator of airtime usage with the idle WLAN state, thereby conserving beacon power when the WLAN exhibits an idle state.

3. A wireless access Point (WAP) transceiver apparatus, configured to support wireless local area network (WLAN) communications with a plurality of station nodes on a selected communication channel including a plurality of orthogonal frequency-division multiplexed (OFDM) sub-carriers; and the WAP transceiver apparatus comprising:
an airtime correlator configured to correlate airtime usage of the selected communication channel by the WAP with one of an idle WLAN state characterized by an absence of upstream or downstream communications and an active WLAN state characterized by at least one of upstream and downstream communications on the WLAN;
a dormancy allocator coupled to the airtime correlator and configured to allocate during at least one of the idle and the active WLAN states, a portion of available airtime to at least one dormancy interval in which a base power level of the WAP is reduced at least below a level required to support downstream communications;
a medium access control (MAC) coupled to the dormancy allocator and configured to identify for the plurality of station nodes on the WLAN, a contention free period overlapping in time with the at least one dormancy interval; thereby avoiding demand for WAP communication resources during the at least one dormancy interval;
a plurality of antenna;
a plurality of shared and discrete components coupled to one another to form transmit and receive chains each coupled to a corresponding one of the plurality of antenna and supporting MIMO communications thereon; and
the dormancy allocator coupled to selected ones of the shared and discrete components and further configured to determine whether the selected communication channel requires dynamic frequency selection (DFS) and in the event of an affirmative determination to maintain power on at least one of the receive chains; thereby allowing in channel monitoring for radar on the selected DFS communication channel during the at least one dormancy interval.

4. A wireless access point (WAP) transceiver apparatus, configured to support wireless local area network (WLAN) communications with a plurality of station nodes on a selected communication channel including a plurality of orthogonal frequency-division multiplexed (OFDM) sub-carriers; and the WAP transceiver apparatus comprising:
an airtime correlator configured to correlate airtime usage of the selected communication channel by the WAP with one of an idle WLAN state characterized by an absence of upstream or downstream communications and an active WLAN state characterized by at least one of upstream and downstream communications on the WLAN;
a dormancy allocator coupled to the airtime correlator and configured to allocate during at least one of the idle and the active WLAN states, a portion of available airtime to at least one dormancy interval in which a base power level of the WAP is reduced at least below a level required to support downstream communications;
a medium access control (MAC) coupled to the dormancy allocator and configured to identify for the plurality of station nodes on the WLAN, a contention free period overlapping in time with the at least one dormancy interval; thereby avoiding demand for WAP communication resources during the at least one dormancy interval;

a plurality of antenna;

a plurality of shared and discrete components coupled to one another to form transmit and receive chains each coupled to a corresponding one of the plurality of antenna and supporting MIMO communications thereon;

a link correlator coupled to selected ones of the shared and discrete components and configured to correlate communication parameters and required power for each link between the WAP and an associated one of the plurality of station nodes and to identify therefrom a weakest link and associated communication parameters therefore; and a beacon optimizer coupled to the airtime correlator and configured to reduce a duration of each beacon by setting at least one of a beacon modulation and coding scheme (MCS) index and a number of beacon streams to a maximum level consistent with actual communications with the station associated with the weakest link as identified by the link correlator, thereby conserving beacon power when the WLAN exhibits an idle state.

5. A method for operating a wireless access point (WAP) transceiver configured to support wireless local area network (WLAN) communications with a plurality of station nodes on a selected communication channel including a plurality of orthogonal frequency-division multiplexed (OFDM) sub-carriers; and the method comprising:

correlating airtime usage of the selected communication channel by the WAP with one of an idle WLAN state characterized by an absence of upstream or downstream communications and an active WLAN state characterized by at least one of upstream and downstream communications on the WLAN; wherein the correlating act further comprises:

correlating airtime usage history with current airtime usage to optimize a correlation between airtime usage and the active and idle WLAN states;

allocating during at least one of the idle and the active WLAN states, a portion of available airtime to at least one dormancy interval in which a base power level of the WAP is reduced at least below a level required to support downstream communications; and identifying for the plurality of station nodes on the WLAN, a contention free period overlapping in time with the at least one dormancy interval; thereby avoiding demand for WAP communication resources during the at least one dormancy interval.

6. A method for operating a wireless access point (WAP) transceiver configured to support wireless local area network (WLAN) communications with a plurality of station nodes on a selected communication channel including a plurality of orthogonal frequency-division multiplexed (OFDM) sub-carriers; and the method comprising:

correlating airtime usage of the selected communication channel by the WAP with one of an idle WLAN state characterized by an absence of upstream or downstream communications and an active WLAN state characterized by at least one of upstream and downstream communications on the WLAN;

allocating during at least one of the idle and the active WLAN states, a portion of available airtime to at least one dormancy interval in which a base power level of the WAP is reduced at least below a level required to support downstream communications;

identifying for the plurality of station nodes on the WLAN, a contention free period overlapping in time with the at least one dormancy interval; thereby avoiding demand for WAP communication resources during the at least one dormancy interval; and extending a beacon interval of intermittent beacons transmitted by the WAP responsive to a correlation in the correlating act of airtime usage with the idle WLAN state, thereby conserving beacon power when the WLAN exhibits the idle state.

7. The method for operating a wireless access point (WAP) transceiver configured to support wireless local area network (WLAN) communications with a plurality of station nodes on a selected communication channel including a plurality of orthogonal frequency-division multiplexed (OFDM) sub-carriers; and the method comprising:

correlating airtime usage of the selected communication channel by the WAP with one of an idle WLAN state characterized by an absence of upstream or downstream communications and an active WLAN state characterized by at least one of upstream and downstream communications on the WLAN;

allocating during at least one of the idle and the active WLAN states, a portion of available airtime to at least one dormancy interval in which a base power level of the WAP is reduced at least below a level required to support downstream communications;

identifying for the plurality of station nodes on the WLAN, a contention free period overlapping in time with the at least one dormancy interval; thereby avoiding demand for WAP communication resources during the at least one dormancy interval;

providing a plurality of antenna;

providing a plurality of shared and discrete components coupled to one another to form transmit and receive chains each coupled to a corresponding one of the plurality of antenna and supporting MIMO communications thereon;

determining whether the selected communication channel requires dynamic frequency selection (DFS); and maintaining power on at least one of the receive chains responsive to an affirmative determination in the determining act; thereby allowing in channel monitoring for radar on the selected DFS communication channel during the at least one dormancy interval.

8. A method for operating a wireless access point (WAP) transceiver configured to support wireless local area network (WLAN) communications with a plurality of station nodes on a selected communication channel including a plurality of orthogonal frequency-division multiplexed (OFDM) sub-carriers; and the method comprising:

correlating airtime usage of the selected communication channel by the WAP with one of an idle WLAN state characterized by an absence of upstream or downstream communications and an active WLAN state characterized by at least one of upstream and downstream communications on the WLAN;

allocating during at least one of the idle and the active WLAN states, a portion of available airtime to at least one dormancy interval in which a base power level of the WAP is reduced at least below a level required to support downstream communications;

identifying for the plurality of station nodes on the WLAN, a contention free period overlapping in time with the at least one dormancy interval; thereby avoiding demand for WAP communication resources during the at least one dormancy interval;

providing a plurality of antenna;

providing a plurality of shared and discrete components coupled to one another to form transmit and receive chains each coupled to a corresponding one of the plurality of antenna and supporting MIMO communications thereon;

correlating communication parameters and required power for each link between the WAP and an associated one of the plurality of station nodes and to identify therefrom a weakest link and associated communication parameters therefore; and reducing a duration of each beacon by setting at least one of a beacon modulation and coding scheme (MCS) index and a number of beacon streams to a maximum level consistent with actual communications with the station associated with the weakest link as identified in the second correlating act, thereby conserving beacon power when the WLAN exhibits an idle state.

* * * * *